United States Patent

[11] 3,623,511

[72] Inventor Leon Levin
 Seyssinet, France
[21] Appl. No. 11,692
[22] Filed Feb. 16, 1970
[45] Patented Nov. 30, 1971
[73] Assignee Societe anonyme dite: B.V.S.
 Grenoble, France

[54] TUBULAR CONDUITS HAVING A BENT PORTION AND CARRYING A FLUID
3 Claims, 10 Drawing Figs.

[52] U.S. Cl. .................................................. 138/39,
 138/177
[51] Int. Cl. .................................................. F15d 1/02

[50] Field of Search .................................................. 138/39–46,
 177

[56] References Cited
UNITED STATES PATENTS
2,056,782 10/1936 Fosdick ........................ 138/39
FOREIGN PATENTS
 192,795 1/1908 Germany ...................... 138/39

Primary Examiner—Houston S. Bell, Jr.
Attorney—Cameron, Kerkam & Sutton

ABSTRACT: A curved pipe is provided having a varying shape but constant area cross section to reduce pressure drop across the bend.

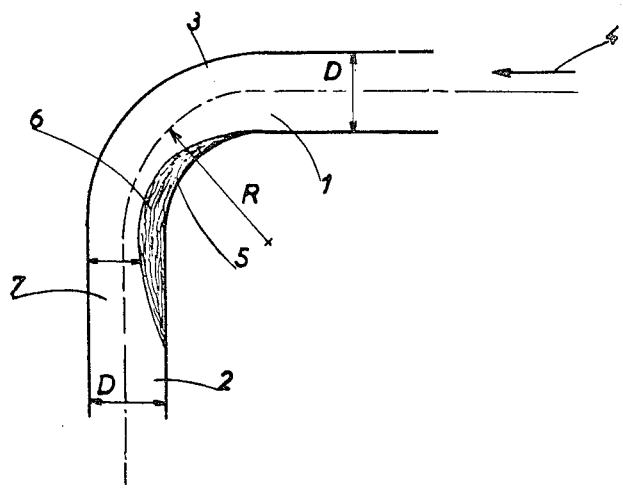
FIG: 1
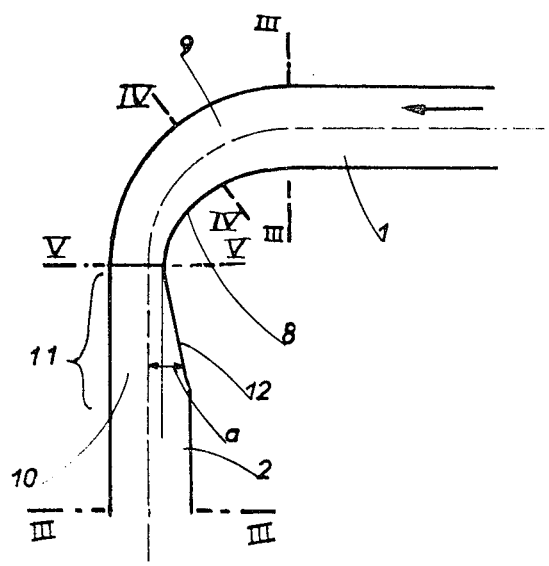
FIG: 2
FIG: 3
FIG: 4
FIG: 5

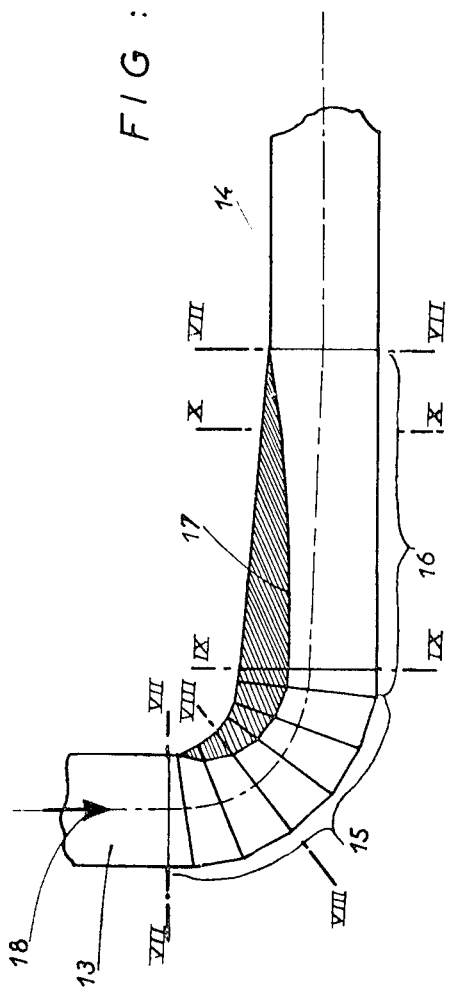
FIG: 6
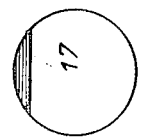
FIG: 10
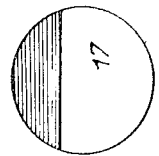
FIG: 9
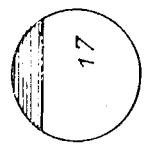
FIG: 8
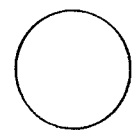
FIG: 7

TUBULAR CONDUITS HAVING A BENT PORTION AND CARRYING A FLUID

This invention relates to improvements to tubular conduits having a bent portion and carrying a fluid.

Any bend in a pipeline results in a pressure loss which increases with an increasing angle of the change of direction of the pipeline and a decreasing R/D ration, R being the radius of curvature of the pipeline and D being its diameter.

The object of the improvements according to the invention is to provide a considerable reduction in the pressure loss in tubular conduits having bent portions.

According to the present invention there is provided a conduit for a predetermined fluid flow, the conduit comprising a curved bore portion the said curved bore portion being connected to an upstream bore portion and to a downstream bore portion, the wall which defines the bore portion situated adjacent the concavity of the curve substantially following in use the hydraulic profile of the active stream of the fluid and a conversion member progressively connecting the curved bore portion to the downstream bore portion of the conduit, the section of the bore curved portion and of the conversion member remaining substantially equal to that of the conduit.

The invention will now be described in greater detail with reference to exemplified embodiments illustrated in the drawings.

FIG. 1 shows a tubular conduit having a bend made in known manner and serving as an explanation of the disadvantages of this type of bend.

FIG. 2 shows a tubular conduit with a curved bore portion according to the invention.

FIGS. 3, 4 and 5 are respectively sections on III—III, IV—IV, and V—V in FIG. 2.

FIG. 6 illustrates another embodiment of the invention.

FIGS. 7, 8, 9 and 10 are respectively sections on VII—VII, VIII—VIII, IX—IX, and X—X in FIG. 6.

FIG. 1 illustrates a tubular conduit of known type comprising a rectilinear upstream portion 1, a rectilinear downstream portion 2, and a bend or curved portion 3. These three portions are, for example, of circular section and their sections are equal.

The liquid moves in the direction of the arrow 4 and it will be seen that in this case the liquid stream separates from the inner wall 5 of the bend and reaches a minimum contracted section at the exit from the bend. This section is clearly less than the section of the conduit and as a result the active stream of the liquid diverges immediately at the bend exit until it completely fills the section of the conduit 2.

FIG. 1 shows the radius of curvature R of the conduit bend. FIG. 1 also shows the constant diameter D of the conduit over its entire length.

Although the contraction and the turbulence produced in the inactive water zone 6 produce a pressure loss, the divergence of the active stream downstream of the bend produces the major part of the pressure loss due to the bend.

FIGS. 2 to 5 illustrate a specific embodiment of the invention. The bend shown in FIG. 1, in which the section of the bend is the same as the section of the upstream and downstream portions, is replaced by a bend whose shape is adapted to that of the liquid stream so as to avoid any detachment of said steam from the inner wall 8 of the bend and so as to maintain a constant active stream section, i.e., maintain a constant speed of the liquid both in the upstream rectilinear portion 1 and in the downstream rectilinear portion 2.

In this case, the conduit comprises a bend 9 and a conversion member 10 disposed in a zone 11, said member connecting the actual bend to the downstream rectilinear portion 2.

In the zone of the bend 9, the wall 8 situated adjacent the concavity substantially follows the hydraulic profile of the active stream of the fluid. To maintain a constant section and hence a constant speed of the fluid in the bend, the latter is enlarged in the direction perpendicular to the plane of FIG. 2. FIG. 3 shows the section at the bend entry. This section is circular and is equal to the section of the rectilinear upstream portion 1. On the other hand, FIG. 4 illustrating a section of the bend itself shows that the bend is enlarged perpendicularly to the plane of FIG. 2 so that the section illustrated in FIG. 4 is substantially equal to that shown in FIG. 3.

FIG. 5 is a section at the exit of the bend 9 and at the entry to the conversion member 10. This section is most contracted in the plane of FIG. 2 but is most enlarged in the direction perpendicular to the plane of FIG. 2, in order to maintain a constant section for the passage of the fluid.

The object of the conversion member 10 is progressively to connect the end of the bend to the rectilinear downstream portion of the conduit while maintaining the same section during the deformations of the conversion member.

As shown in FIG. 2, the conversion member 10 connected to the rectilinear portion 2 has—adjacent the concavity of the bend and in the plane passing through the axes of the rectilinear upstream and downstream portions—a substantially rectilinear profile 12 forming an angle $a$ with the axis of the rectilinear downstream portion 2.

The contracted-profile bends and the conversion members may be made as mouldings, stampings or pressings and welded-together halves.

FIGS. 6 to 10 illustrate another embodiment of the invention which is applied, for example, for large diameter pipelines. In this case the conduit consists of successive elements of circular section comprising elements of larger section for the bend and in the zone of the conversion member than in the upstream and downstream portions.

The wall situated adjacent the concavity is in this case formed by an additional partition perpendicular to the plane passing through the axis of the downstream portion and through the axis of the upstream portion, said partition forming part of a cylinder whose generatrices are perpendicular to said plane, and being so disposed that it restores the equality of the sections between the upstream and downstream portions, the bend, and the conversion member.

The conduit shown in FIG. 6 comprises a rectilinear upstream portion 13, a rectilinear downstream portion 14, a bend in a zone 15, and a conversion member in a zone 16.

The conduit is made from coiled and welded sheet steel.

The section of the upstream and downstream portions is shown in FIG. 7. The section of the elements forming the bend 15 increases from the upstream portion as far as the conversion member. FIG. 8 is a section on the line VIII—VIII of the bend and this section is larger than the section shown in FIG. 7. FIG. 9 is a section at the entry to the conversion member, i.e., at the exit from the bend, and the section is still greater than the preceding section.

In the conversion member, the section decreases progressively and FIG. 10 shows an example thereof near the exit of the conversion member.

The assembly of the parts 13, 15, 16 and 14 thus forms a conduit, the inside diameter of which varies and is at a maximum at the junction between the exit of the bend 15 and the entry to the conversion member 16.

According to the invention, the passage section of the active stream of liquid must be substantially constant. To obtain this constant section a partition 17 is added as shown in FIGS. 6, 8, 9 and 10. This partition constitutes a wall of a cylinder whose generatrices are perpendicular to the plane of the Figure.

The liquid moves in the conduit in the direction of arrow 18 and the partition 17 forms a guide for the active stream of the fluid, and said stream does not become detached from the guide, the latter being designed for this purpose as in FIG. 2.

As a result of the partition 17, the conduit shown in FIGS. 6 to 10 has a substantially constant section and since the active stream of the fluid undergoes no detachment with respect to the partition, the pressure loss resulting from the interposition of the bend is not much greater than that of the continuous friction on the walls.

Of course the invention is not limited to the above-described embodiments which can be modified without departing from the scope of the invention.

For example, the conduits can carry any type of fluid, i.e., a gas, vapor, or liquid.

The conduits need not be made only of metal but may be made from any other acceptable material allowing for the fluid being carried. The conduits may also be made from concrete, cement or plastics or any other material allowing a shape to be obtained by molding or by the use of appropriate formwork.

If the structure is made from metal conduits, the space between the partition 17 and the concave wall of the conduit is filled with concrete or any other compact material.

By the use of the embodiments described, it is possible to provide pipelines with a much smaller radius of curvature and a lower pressure loss than would be the case with larger radii of curvature on pipelines without the improvements according to the invention. By reducing the radii of curvature appreciable reductions in size are possible, particularly in the case of complex piping systems.

These improvements have very great advantages for petroleum and refining plant pipelines, steam and gas pipes, and hydroelectric station penstocks.

I claim:

1. Improvements in curved tubular conduits comprising an entry section and an exit section of equal circular cross section, a plurality of transverse sections between said entry and said exit sections said transverse sections in the radial plane passing through the central axes of said circular entry and exit sections having progressively decreasing widths from said entry section to an intermediate one of said transverse sections between said entry section and said exit section, the widths of said transverse sections then progressively increasing from said intermediate transverse section to said exit section, the conduit in said radial plane on the convex side of the curve being perpendicular to said exit section, the conduit on the concave side of the curve having a substantially straight contour, the heights of said transverse sections perpendicular to said radial plane increasing from said entry section to said intermediate transverse section and decreasing from said intermediate transverse section to said exit section, said transverse sections each having an area equal to the area of said entry section and to the area of said exit section.

2. Improvements in curved tubular conduits as described in claim 1, said transverse sections being circular in cross section and including a partition in said transverse sections adjacent the concave side of the curve and forming a portion of a cylinder having generatrices perpendicular to said radial plane.

3. Improvements in curved tubular conduits as described in claim 2, including a concrete filler in the space between said partition and said transverse sections on the concave side of the curve.

* * * * *